(12) United States Patent
Boscolo et al.

(10) Patent No.: US 7,237,263 B1
(45) Date of Patent: Jun. 26, 2007

(54) REMOTE MANAGEMENT OF PROPERTIES, SUCH AS PROPERTIES FOR ESTABLISHING A VIRTUAL PRIVATE NETWORK

(75) Inventors: Christopher Boscolo, Bellevue, WA (US); Shabnam Erfani, Seattle, WA (US); Mark Hughes, Seattle, WA (US); Brad Robel-Forrest, North Bend, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 1037 days.

(21) Appl. No.: 09/800,754

(22) Filed: Mar. 6, 2001

(51) Int. Cl.
*G06F 17/00* (2006.01)
(52) U.S. Cl. .............................. 726/15; 726/14; 726/11
(58) Field of Classification Search ................ 370/252; 707/7; 709/221, 223, 229; 713/200, 201; 714/4, 732; 726/11–15
See application file for complete search history.

(56) References Cited

U.S. PATENT DOCUMENTS

| | | | | |
|---|---|---|---|---|
| 5,528,602 | A * | 6/1996 | West et al. ................. | 714/732 |
| 6,701,358 | B1 * | 3/2004 | Poisson et al. ............. | 709/223 |
| 6,754,844 | B1 * | 6/2004 | Mitchell ........................ | 714/4 |

OTHER PUBLICATIONS

Bruce Schneier, 1996, John Wiley & Sons, Inc., "Applied Cryptography", pp. 30, 429, and 436.*
http://www.watchguard.com/products/fb-ssl.asp.*
A policy-based network management system for IP VPN Xin Guo; Kun Yang; Galis, A.; Xiaochun Cheng; Bo Yang; Dayou Liu; Communication Technology Proceedings, 2003. ICCT 2003. International Conference on vol. 2, Apr. 9-11, 2003 pp. 1630-1633 vol. 2.*
Resource management in virtual private networks over ATM Hamchaoui, I.; Guillemin, F.; IEEE ATM Workshop 1997. Proceedings May 25-28, 1997 pp. 659-668.*
Becker, B., "System Description for VPN Policy Manager and SafeNet/Soft PK", IRE, Jun. 16, 1999, 7 pages.
"NetBSD Documentation: NetBSD Ipsec", The NetBSD Foundation, Inc. 1998, 12 pages [http://www.netbsd.org/Documentation/network/ipsec/ Accessed Mar. 2, 2001].
Hertel, C., "3. NBT: NetBIOS over TCP/IP", 1999, 26 pages.
Postel, J., "Internet Control Message Protocol, DARPA Internet Program Protocol Specification", Sep. 1981, 14 pages.
"Protocol Standard for a NetBIOS Service on a TCP/UDP Transport: Concepts and Methods", NetBIOS Working Group, Mar. 1987, 64 pages.
Rivest, R., "The MD5 Message-Digest Algorithm", MIT Laboratory for Computer Science and RSA Data Security, Inc., Apr. 1992, 19 pages.
Thayer, R., et al., "IP Security Document Roadmap", Sable Technology Corporation, Bay Networks, NIST, Nov. 1998, 10 pages.
Kent, S. et al., "Security Architecture for the Internet Protocol", BBN Corp., @Home Network, Nov. 1998, 59 pages.

* cited by examiner

*Primary Examiner*—David Jung
(74) *Attorney, Agent, or Firm*—Perkins Coie LLP

(57) ABSTRACT

A facility in a single manager computer system for managing properties for a plurality of managed computer systems is described. The facility reiteratively receives new managed properties for an identified managed computer system. In response, the facility delivers the received new managed properties to the identified managed computer system.

38 Claims, 4 Drawing Sheets

REMOTE MANAGEMENT OF PROPERTIES, SUCH AS PROPERTIES FOR ESTABLISHING A VIRTUAL PRIVATE NETWORK

TECHNICAL FIELD

The present invention is directed to the fields of property management and network security.

BACKGROUND

A virtual private network ("VPN") uses encryption techniques to provide secure communication between two or more private networks using a public network, such as the Internet.

In view of the increasing ubiquity of public networks like the Internet, VPNs have a number of productive applications. For example, a VPN may be used to replace a wide area network ("WAN"). A business that maintains offices in different cities typically connects the computers in each office with a private local area network ("LAN"). In order to facilitate communications between computers in different offices, such a company would traditionally connect the LANs with a WAN, typically running across dedicated leased lines. While such a WAN is secure, the leased lines it requires typically constitute a significant ongoing expense. Further, the data transfer speed of such WANs often leave much to be desired compared to speeds that can be achieved on the modern Internet. Where each of the offices is or can be connected to the Internet, replacing such a WAN with a VPN can reduce costs while simultaneously increasing data transfer speed. Given the significant economy of this solution, the VPN can be used to connect much smaller offices—such as home offices—that could be connected by the WAN.

Additionally, a VPN may be used to secure communications for more transient applications, such as communications with a user traveling with a portable computer and connecting via an Internet dialup connection for short periods each day from different locations, or communications with a client to install a product for the client over a brief period.

Unfortunately, VPNs have conventionally been both difficult and expensive to establish, and to manage once established. As a result, the widespread adoption of VPNs has been significantly inhibited.

Accordingly, a system for centrally and straightforwardly establishing and managing VPNs would have significant utility. Indeed, a more generalized facility implementing centrally-managed properties more generally would also have significant utility.

DETAILED DESCRIPTION

A software facility for centrally managing properties, such as properties establishing a VPN, is described. In some embodiments, the facility enables a user to issue a single instruction to establish a VPN between two or more private networks utilizing a security device in each of the private networks, such as a firewall. In some embodiments, a user can use the facility to establish a VPN by merely selecting the security devices it will connect, and, optionally, a level of security to use. This process is substantially easier for a user than conventional approaches to establishing a VPN.

Each security device may be a specialized device, or a general-purpose computer executing security software. The facility uses templates, together with specific information about the private networks and attributes specified for the VPN, to generate a set of properties for the security device for each private network, which the facility automatically distributes to the corresponding security devices in order to establish the VPN.

In this manner, the facility greatly reduces the difficulty, and indeed the cost, of establishing a VPN, thereby making VPN use feasible for a wide variety of organizations, and even for individuals.

Embodiments of the facility can remotely manage properties of various types for property clients, which may either be general-purpose computer systems or special-purpose devices. In some embodiments, each property client has an overall property set that it maintains and uses in aspects of its operation, which may include properties managed remotely by the facility. Each property client periodically requests property updates from the facility, enclosing an indication of the generation date of its current overall property set. If the facility has received updates to managed properties for the property client, the facility instructs the property client to transmit its current overall property set to the facility. The facility, when it receives the property client's current overall property set, makes a copy and substitutes for any managed properties in the copy the updated managed properties. If the resultant new overall property set differs from the current overall property set, the facility sends the new overall property set to the property client for use by the property client. Otherwise, the facility instructs the property client to continue to use its current overall property set.

By updating properties in this manner, the facility enables properties of the property clients to be effectively managed remotely. The facility also saves the processing capacity and bandwidth needed to send the overall property set to the facility, and to send a new overall property set to the property client, where these steps are unnecessary.

Figure 1:
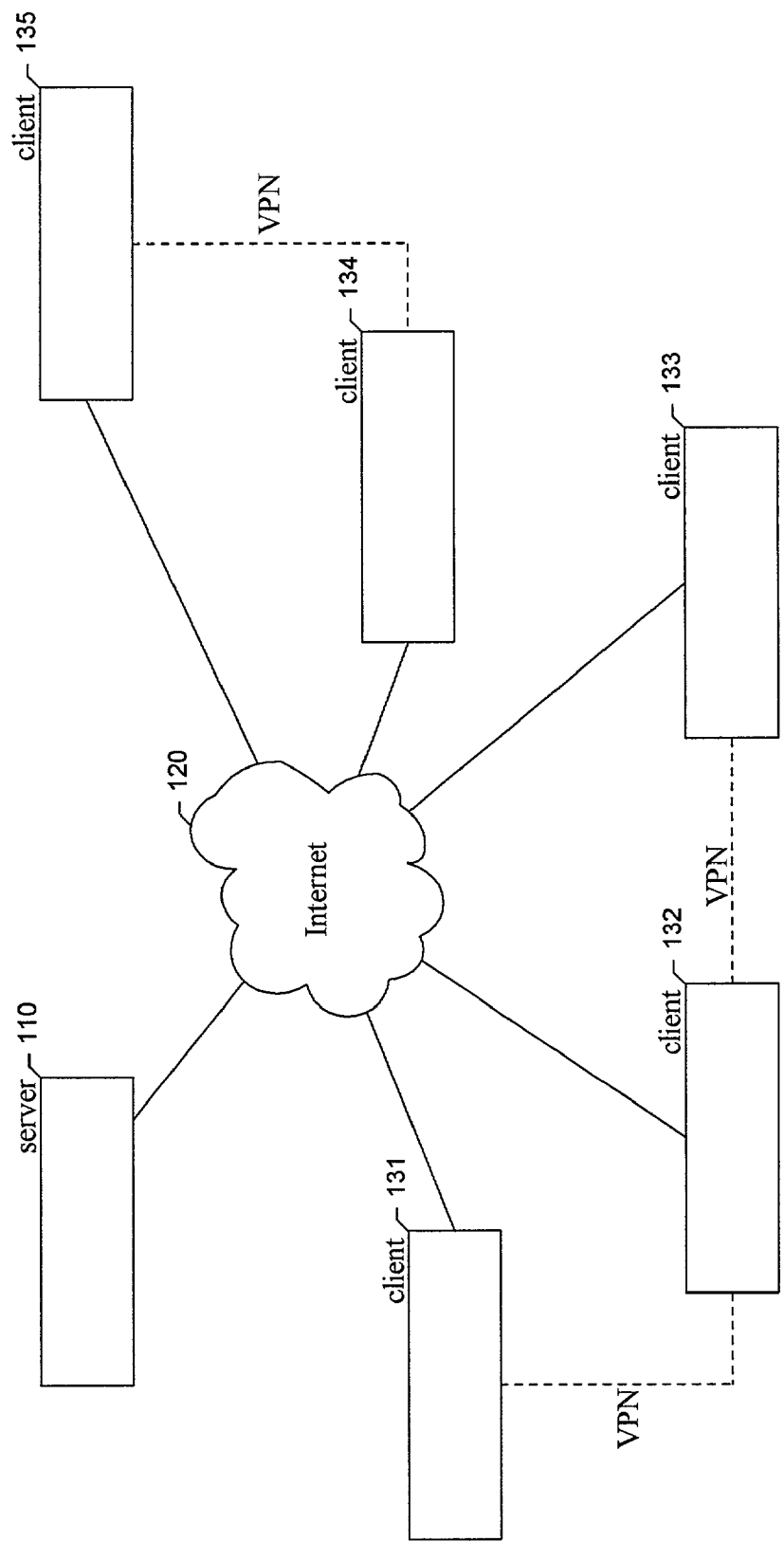
FIG. 1 is a high-level network diagram showing a typical environment in which the facility operates.

FIG. 1 is a high-level network diagram showing a typical environment in which the facility operates. The facility uses one or more property servers 110 to centrally and/or remotely manage properties for one or more property clients, such as clients 131–135. Each server is typically a general-purpose computer system having one or more processors, memories, non-volatile storage devices, and computer-readable media drives. Each client may be such a general-purpose computer system, or may be a more specialized device, such as a network security device, such as a firewall or gateway.

As part of such property management, the server communicates with each of the clients, such as via the Internet 120. Those skilled in the art will recognize that the server may communicate with clients via any of a number of types of connections. In some embodiments, the server and clients communicate via a secure connection, such as with encrypted messages sent via the Internet.

In some embodiments, the properties managed for the clients by the server establish, maintain, modify, or terminate VPNs between selected clients. For example, properties managed by the facility create a VPN between clients 134 and 135, and create VPNs between client 132 and each of clients 131 and 133. Those skilled in the art will appreciate that the facility may manage other types of properties on behalf of the clients.

Figure 2:
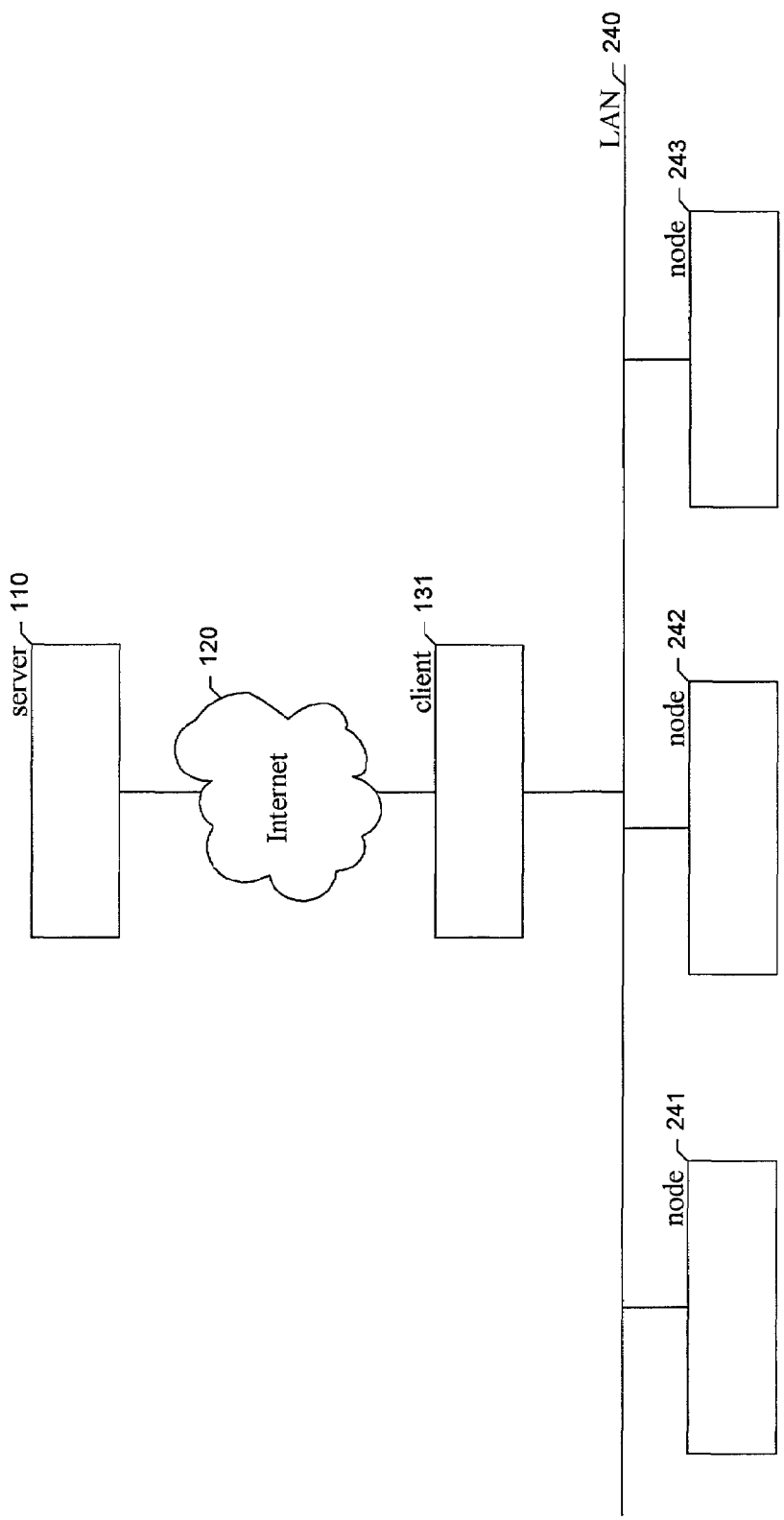
FIG. 2 is a network diagram from the perspective of a typical single property client that is a network security device.

FIG. 2 is a network diagram from the perspective of a typical single property client that is a network security device or network gateway. This diagram shows that this client 131, which is connected to the Internet 120, and, therethrough, to the server 110, regulates access between the Internet and nodes 241–243 on a LAN 240. These nodes, and, indeed, any nodes later added to the LAN, are known as protected resources, both relative to the network security device 131, and relative to any VPNs established between the LAN and other private networks.

In some embodiments, VPNs established between the LAN 240 and other private networks are tunneling VPNs implemented with a collection of protocols collectively known as the Internet Protocol Security standard ("IPSec"). The IPSec standard is comprised of protocols such as the following: Authentication Header, which provides an authenticity guarantee for packets; Encapsulating Security Payload, which provides a confidentiality guarantee for packets; IP payload compression, which reduces the size of packets; and Internet Key Exchange, for negotiating encryption keys. IPSec is described in greater detail in R. Thayer, N. Doraswami, and E. Glen, *RFC* 2411: *IP Security Document Roadmap*, Network Working Group, 1998; and S. Kent and R. Atkinson, *RFC* 2401: *Security Architecture for the Internet Protocol*, Network Working Group, 1998. Those skilled in the art will recognize that VPNs based upon a variety of other networking protocols may also be established by the facility.

Figure 3:
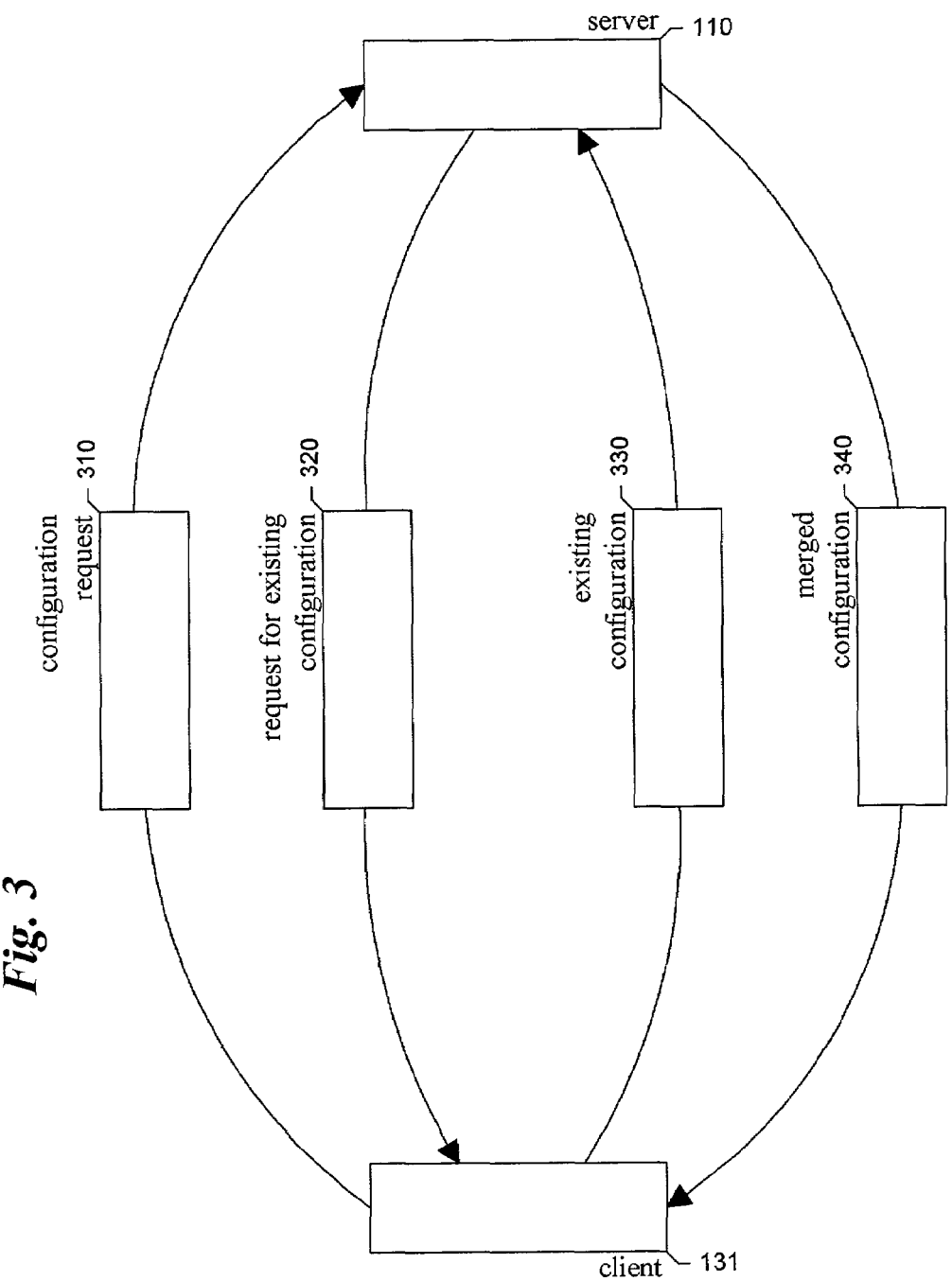
FIG. 3 is a data flow diagram showing data exchanged between a property server and a property client in order to manage properties of the client, also called the client's "configuration."

FIG. 3 is a data flow diagram showing data exchanged between a property server and a property client in order to manage properties of the client. These properties of the client are also referred to herein as the client's "configuration." As it does periodically, the client 131 sends the server 110 a configuration request 310. The configuration request is a request for any updates to the client's configuration. In some embodiments, the configuration request contains information indicating the generation date and/or the contents of the configuration currently used by the client, which may be used by the server to determine whether the configuration currently being used by the client is appropriate for continued use. For example, the configuration request may contain a timestamp indicating the time at which the configuration currently being used was generated, or a timestamp indicating when it was most recently modified.

Upon receiving the configuration request, the server replies with a request for existing configuration 320. The request for existing configuration is an instruction to the client to reply with a copy of the configuration currently being used by the client. In some cases, where it can be determined by the server from the information contained in the configuration request that the client should continue using the existing configuration, the server does not send the request for existing configuration as shown, but rather instructs the client to continue using the existing configuration.

Upon receiving the request for existing configuration, the client sends an existing configuration 330, containing a copy of the configuration being used by the client.

When the server receives the existing configuration, it merges the managed properties that it is managing for the client into the existing configuration, which it sends to the client as merged configuration 340. Upon receiving the merged configuration, the client adopts it, thereafter using the merged configuration. Where the server can determine that the merged configuration is identical or insubstantially different from the existing configuration, the server may send the client an instruction to continue using its existing configuration, rather than sending the merged configuration as shown.

Figure 4:
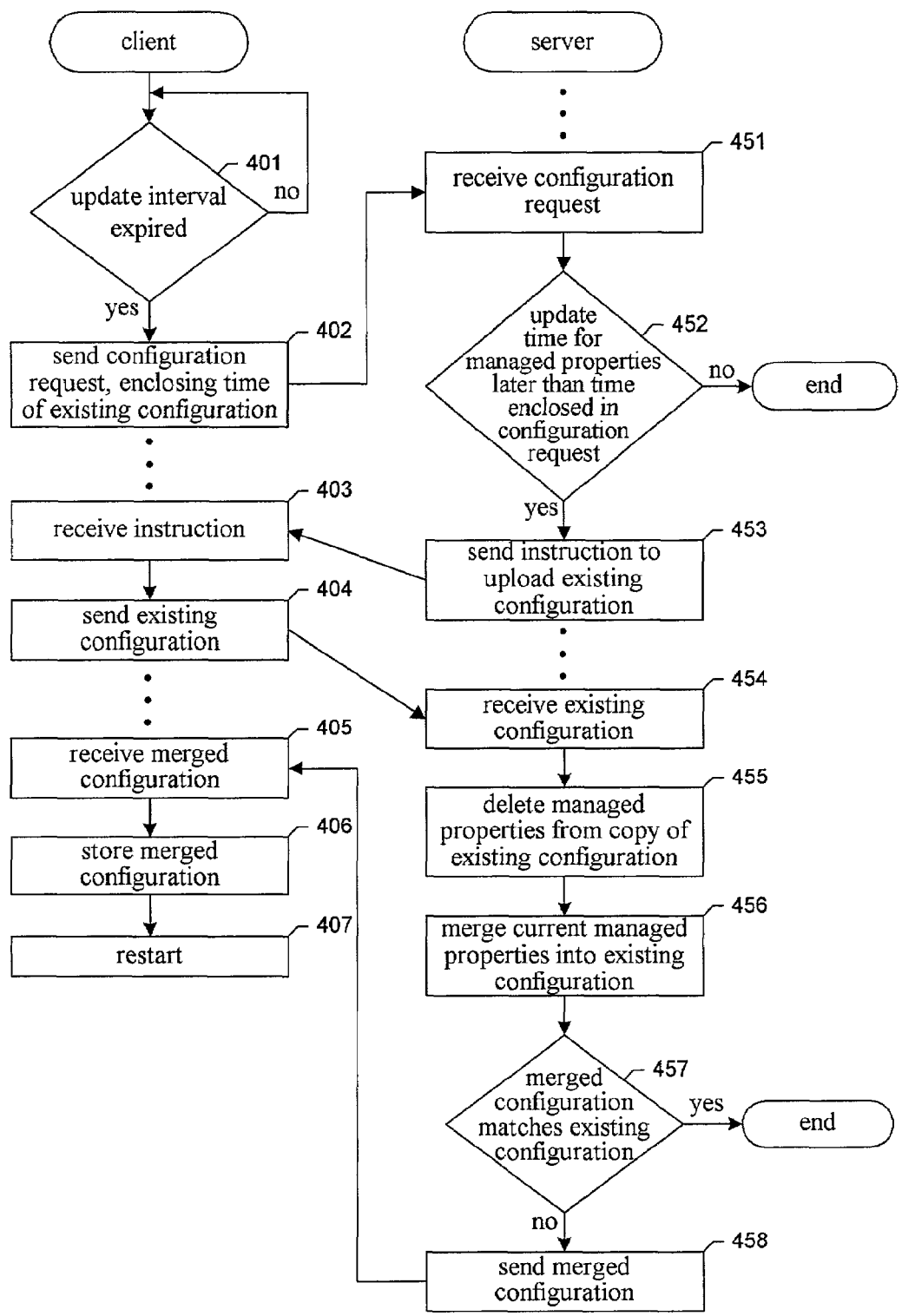
FIG. 4 is a flow diagram showing steps typically performed by the facility in a property client and a property server to maintain a configuration for the property client.

FIG. 4 is a flow diagram showing steps typically performed by the facility in a property client and a property server to maintain a configuration for the property client. In step 401, if a configurable update interval—such as one hour—has expired since the last time the client updated its configuration, then the facility continues in step 402, else these facility continues in step 401 to await the expiration of the update interval. In step 402, the client sends a configuration request to the server, enclosing a timestamp associated with the existing configuration.

In step 451, the server receives the configuration request sent in step 402. In step 452, if the latest update time for the managed properties is later than the time corresponding to the timestamp enclosed in the configuration request, then the facility continues in step 453 to continue the configuration update process, else these steps conclude. In some embodiments, before these steps conclude, the server sends the client an instruction to continue using its existing configuration (not shown). In step 453, the server sends an instruction to the client to upload a copy of its existing configuration.

In step 403, the client receives the instruction sent in step 453. In step 404, in response to receiving the instruction, the client sends a copy of the existing configuration to the server.

In step 454, the server receives the copy of the existing configuration sent by the client in step 404. In step 455, the server deletes managed properties from the received copy of the existing configuration. In various embodiments, the facility identifies managed properties for deletion from the existing configuration using (1) an indication stored in the properties themselves that they are managed properties; (2) administrative properties among the properties of the configuration identifying the managed properties; (3) a separate indication stored in the server identifying the managed properties among the properties of the configuration; or a similar scheme.

In step 456, the facility merges the current version of properties managed for the client into the existing configuration to maintain a configuration for the property client. In some embodiments, managed properties are specified by an administrator or another user using templates. In order to specify managed properties using a template, the user selects an appropriate template, then either supplies or designates a source for particular data to populate the template. For example, establishing a new VPN may involve using one or more templates to establish properties for each of the security device clients that operate the VPN. In the scenario in which managed properties are specified using templates, the managed properties that are merged into individual client's overall properties may change in a number of ways. As one example, the properties may change when a new template is selected by a user. As another example, the properties may change if a template previously selected by a user to specify properties for a particular client is revised. In this event, the properties for each property client for which that template was selected are modified accordingly.

In step 457, if the merged configuration matches the existing configuration, then the merged configuration need not be sent to the client and these steps conclude, else the facility continues in step 458. If these configurations match, the server may send the client an instruction to continue using its existing configuration (not shown).

The facility may perform the comparison shown in step 457 in a variety of different ways. The facility may directly compare the contents of the merged configuration to the contents of the existing configuration. Alternatively, the facility may generate and compare summaries or digests of the two configurations. For example, the facility may generate digests of the configurations using a hashing algorithm, such as the MD5 message digest algorithm, described in R. L. Rivest, *RFC* 1321: *The MD5 Message-Digest Algorithm*, Internet Activities Board, 1992. The comparison may either determine whether these two configurations are identical, whether they are equivalent, or whether they are substantially equivalent.

In step 458, the server sends the merged configuration to the client.

In step 405, the client receives the merged configuration sent in step 458. In step 406, the client stores the merged configuration. In step 407, the client restarts to begin using the stored merged configuration.

To more fully describe the facility, its operation is discussed in conjunction with an example below. In the example, the facility merges managed properties into the configuration of a security device causing the security device to participate in a VPN.

Table 1 immediately below shows an initial configuration for a security device protecting the private network 10.32.91.0/24. The properties in this configuration relate to aspects of network protection other than VPNs.

TABLE 1

```
 1  config.version: 0.1
 2  #
 3  ########### wg.cfg for Release 4.1
 4  ########### (C) 1996–2000 WatchGuard Technologies, Inc.
 5  ########### All Rights Reserved
 6  #
 7
 8  config.watchguard.release: shoreline
 9  #
10  default.antispam.domain here0
11  rbl.maps.vix.com
12      dul.maps.vix.com
13      rss.maps.vix.com
14      relays.orbs.org
15  here0
16  default.proxies.ftp.incoming.log.accounting: 0
17  default.proxies.ftp.outgoing.log.accounting: 0
18  default.proxies.ftp.outgoing.readonly: 0
19  default.proxies.ftp.readonly: 1
20  #
21  default.proxies.ftp.sessions: 60
22  default.proxies.ftp.site: 0
23  default.proxies.ftp.timeout: 1800
24  default.proxies.http.anonymize: 1
25  default.proxies.http.known__headers here0
26  Accept
27      Accept-Charset
28      Accept-Encoding
29      Accept-Language
30      Accept-Ranges
31      Age
32      Allow              # additional
33      Alternates         # additional
34      Authorization
35      Cache-Control
36      Connection
37      Content-Base
38      Content-Encoding
39      Content-Language
40      Content-Length
41      Content-Location
42      Content-MD5
43      Content-Range
44      Content-Type
45      Content-Version    # additional
46      Cookie             # netscapism
47      Date
48      Derived-From       # additional
49      ETag
50      Expires
51      From
52      Host
53      If-Modified-Since
54      If-Match
```

TABLE 1-continued

| | | |
|---|---|---|
| 55 | If-None-Match | |
| 56 | If-Range | |
| 57 | If-Unmodified-Since | |
| 58 | Keep-Alive | # v1.0 |
| 59 | Last-Modified | |
| 60 | Link | # additional |
| 61 | Location | |
| 62 | Max-Forwards | |
| 63 | MIME-Version | |
| 64 | Pragma | |
| 65 | Proxy-Authenticate | |
| 66 | Proxy-Authorization | |
| 67 | Proxy-Connection | |
| 68 | Public | |
| 69 | Range | |
| 70 | Referer | |
| 71 | Retry-After | |
| 72 | Set-Cookie | # netscapism |
| 73 | Server | |
| 74 | Transfer-Encoding | |
| 75 | UA-pixels | # explorerism |
| 76 | UA-color | # explorerism |
| 77 | UA-OS | # explorerism |
| 78 | UA-CPU | # explorerism |
| 79 | Upgrade | |
| 80 | User-Agent | |
| 81 | URI | # v1.0 (deprecated) |
| 82 | Vary | |
| 83 | Via | |
| 84 | Warning | |
| 85 | WWW-Authenticate | |
| 86 | here0 | |
| 87 | default.proxies.http.log_access: 1 | |
| 88 | default.proxies.http.no_cookies: 0 | |
| 89 | default.proxies.http.no_submissions: 0 | |
| 90 | default.proxies.http.remove_unknown: 1 | |
| 91 | default.proxies.http.safe_content: 1 | |
| 92 | default.proxies.http.safe_content_types here0 | |
| 93 | text/* | |
| 94 |     image/* | |
| 95 |     audio/* | |
| 96 |     video/* | |
| 97 |     application/x-wls | |
| 98 | here0 | |
| 99 | default.proxies.http.sigs.applets.cab.deny: yes | |
| 100 | default.proxies.http.sigs.applets.cab.sig: @MSCF%00%00%00%00 | |
| 101 | default.proxies.http.sigs.applets.java.deny: yes | |
| 102 | default.proxies.http.sigs.applets.java.sig: @%ca%fe%ba%be | |
| 103 | default.proxies.http.sigs.applets.ocx.deny: yes | |
| 104 | default.proxies.http.sigs.applets.ocx.sig: | |
| 105 | @%5a%4d%00%90%00%03%00%00%00%04%00%00%ff%ff%00%00 | |
| 106 | default.proxies.http.sigs.http_reqs here0 | |
| 107 | @GET%20 | |
| 108 |     @HEAD%20 | |
| 109 |     @POST%20 | |
| 110 |     @PUT%20 | |
| 111 |     @CHECKIN%20 | |
| 112 |     @CHECKOUT%20 | |
| 113 |     @DELETE%20 | |
| 114 |     @LINK%20 | |
| 115 |     @UNLINK%20 | |
| 116 |     @OPTIONS%20 | |
| 117 |     @PATCH%20 | |
| 118 |     @TRACE%20 | |
| 119 | here0 | |
| 120 | default.proxies.http.sigs.http_resps: @HTTP/ | |
| 121 | default.proxies.http.timeout: 600 | |
| 122 | default.proxies.realaudio.incoming.log.accounting: 0 | |
| 123 | default.proxies.realaudio.outgoing.log.accounting: 0 | |
| 124 | default.proxies.smtp.incoming.allowed.addrs.8bit: yes | |
| 125 | default.proxies.smtp.incoming.allowed.addrs.chars: _-.+=%*/~!^&? | |
| 126 | default.proxies.smtp.incoming.allowed.addrs.routes: no | |
| 127 | default.proxies.smtp.incoming.allowed.esmtp.etrn: no | |
| 128 | default.proxies.smtp.incoming.allowed.from: * | |
| 129 | default.proxies.smtp.incoming.allowed.headers here0 | |
| 130 | X-* | |
| 131 | Received | |
| 132 | From | |
| 133 | To | |

TABLE 1-continued

```
134  cc
135  bcc
136  Resent-To
137  Resent-cc
138  Resent-bcc
139  Resent-Message-ID
140  Resent-Reply-To
141  Resent-From
142  Resent-Date
143  Resent-Sender
144  Message-ID
145  In-Reply-To
146  References
147  Keywords
148  Subject
149  Comments
150  Encrypted
151  Date
152  Reply-To
153  Return-path
154  Sender
155  MIME-Version
156  Content-Type
157  Content-Language
158  Content-Length
159  Content-Disposition
160  Content-Transfer-Encoding
161  Content-ID
162  Content-Description
163  Content-MD5
164  Encoding
165  Precedence
166  Approved-By
167  Status
168  here0
169  default.proxies.smtp.incoming.allowed.safe_content: yes
170  default.proxies.smtp.incoming.allowed.safe_content.deny_msg: [Attachment denied
171  by WatchGuard SMTP proxy (type "%t", filename "%f")]
172  default.proxies.smtp.incoming.allowed.safe_content.types here0
173  text/*
174  image/*
175  audio/*
176  video/*
177  multipart/*
178  message/*
179  application/x-wls
180  here0
181  default.proxies.smtp.incoming.allowed.to: *
182  default.proxies.smtp.incoming.denied.file_patterns: *.bat *.exe *.hta *.js *.vb?
183  *.wsf*.wsh*.shs
184  default.proxies.smtp.incoming.denied.from:
185  default.proxies.smtp.incoming.denied.to:
186  default.proxies.smtp.incoming.log.accounting: 0
187  default.proxies.smtp.incoming.timeout: 600
188  default.proxies.smtp.max.size: 3000
189  default.proxies.smtp.max.to: 99
190  default.proxies.smtp.outgoing.allowed.headers here0
191  From
192  To
193  cc
194  bcc
195  Resent-To
196  Resent-cc
197  Resent-bcc
198  Resent-Message-ID
199  Resent-Reply-To
200  Resent-From
201  Resent-Date
202  Message-ID
203  In-Reply-To
204  References
205  Keywords
206  Subject
207  Comments
208  Encrypted
209  Date
210  Reply-To
211  MIME-Version
212  Content-Type
```

TABLE 1-continued

```
213  Content-Language
214  Content-Length
215  Content-Disposition
216  Content-Transfer-Encoding
217  Content-ID
218  Content-Description
219  Content-MD5
220  Encoding
221  Precedence
222  Approved-By
223  Status
224  here0
225  default.proxies.smtp.outgoing.domain:
226  default.proxies.smtp.outgoing.log.accounting: 0
227  default.proxies.smtp.outgoing.masquerade.from:
228  default.proxies.smtp.outgoing.masquerade.from.except:
229  default.proxies.smtp.outgoing.masquerade.mime: no
230  default.proxies.smtp.outgoing.masquerade.msgid: no
231  default.proxies.smtp.outgoing.timeout: 600
232
233  #
234  ########### handsfree installer
235  #
236  installer.enable: no
237  installer.force.trusted.optional.loopback: no
238  installer.frontpanel.enable: no
239  installer.loopback.detect: no
240  networking.bastion: eth2
241  networking.bridge.external: 192.168.49.254
242  networking.bridge.optional:
243  networking.dhcpd.default.default_lease_time: 21600
244  networking.dhcpd.default.max_lease_time: 43200
245  networking.dhcpd.default.router: auto
246  networking.dhcpd.default.serverid: auto
247  networking.dhcpd.default.subnet: auto
248  networkmg.dhcpd.devices: trusted optional
249  #
250  ########### DHCP server
251  #
252  networking.dhcpd.enable: no
253  networking.domain_suffix:
254  networking.ethernet.00: eth0 192.168.49.91 192.168.49.0 255.255.255.0
255  192.168.49.254
256  networking.ethernet.01: eth1 10.32.91.91 10.32.91.0 255.255.255.0 none
257  networking.ethernet.02:
258
259  #
260  ########### Some global networking options
261  ########### These shouldn't need to change
262  #
263
264  networking.external: eth0
265  networking.hostname: watchguard
266  networking.nameservice.remote.dns. 0:
267  networking.nameservice.remote.dns. 1:
268  networking.nameservice.remote.wins. 0:
269  networking.nameservice.remote.wins. 1:
270  networking.oob.chat.ttyS0: "" +\p+\p+\d\r\pATH "" \dAT&F OK ATE0 OK ATS0=1 OK
271  networking.oob.chat.ttyS2: "" +\p+\p+\d\r\pATH "" \dAT&F OK ATE0 OK ATS0=1 OK
272
273  #
274  ########### out-of-band
275  #
276  networking.oob.debug: no
277  networking.oob.ppp.ttyS0: 38400 crtscts silent 192.168.254.1:192.168.254.2
278  networking.oob.ppp.ttyS2: 38400 crtscts silent 192.168.254.1:192.168.254.2
279  options.controld.control_tty: /dev/ttyS0
280  #
281  options.controld.log_host: 192.168.50.21=020d0d4929587f6b162f0473457a6861
282  options.controld.logdb_entries: 100000
283  options.controld.notify_host:
284  options.controld.serial_config: 1
285  options.controld.tcp_config: write
286  options.default.incoming.command:
287  options.default.incoming.count: 10
288  #
289  options.default.incoming.hostile: no
290  options.default.incoming.interval: 15
291  options.default.incoming.log_broadcasts: no
```

TABLE 1-continued

```
292  options.default.incoming.log_level: warning
293  options.default.incoming.notification: no
294  options.default.outgoing.command
295  options.default.outgoing.count: 10
296  options.default.outgoing.interval: 15
297  options.default.outgoing.log_broadcasts: no
298  options.default.outgoing.log_level: debug
299  options.default.outgoing.notification: no
300  #
301  options.fail-over.bcast_cookie: true
302  options.fail-over.hb_delay: 5
303  options.fail-over.state: 5
304  options.filter.vpn_bypass: no
305  options.hostile_port.command:
306  options.hostile_port.count:
307  options.hostile_port.hostile: no
308  options.hostile_port.interval:
309  #
310  options.hostile_port.list:
311  options.hostile_port.log_level: warning
312  options.hostile_port.notification: no
313  options.hostile_site.command:
314  options.hostile_site.count:
315  options.hostile_site.duration: 20
316  options.hostile_site.exceptions:
317  options.hostile_site.interval:
318  #
319  options.hostile_site.list:
320  options.hostile_site.log_level: info
321  options.hostile_site.notification: no
322  options.ipoptions.block: no
323  options.ipoptions.command:
324  options.ipoptions.count: 0
325  options.ipoptions.interval: 0
326  options.ipoptions.log_level: warning
327  options.ipoptions.notification: no
328  options.masquerade.tcp.fin.timeout: 15
329  options.masquerade.tcp.timeout: 43205
330  options.masquerade.udp.timeout: 15
331  options.notification.interval: 60
332  #
333  options.notification.mail_address: nobody
334  options.notification.pager_code:
335  options.notification.pager_num:
336  #
337  options.probe.address: no
338  options.probe.address.command:
339  options.probe.address.count: 10
340  options.probe.address.hostile: 1
341  options.probe.address.interval: 15
342  options.probe.address.log_level: info
343  options.probe.address.notification: no
344  options.probe.port: no
345  options.probe.port.command:
346  options.probe.port.count: 10
347  options.probe.port.hostile: 1
348  options.probe.port.interval: 15
349  options.probe.port.log_level: warning
350  options.probe.port.notification: no
351  #
352  options.proxies.http.webblocker.denymsg: Request blocked by WebBlocker
353  options.services.block_nonestablished_tcp: yes
354  options.services.dynamic.timeout.tcp: 43200
355  options.services.dynamic.timeout.tcp.fin: 10
356  options.services.dynamic.timeout.tcp.linger 10
357  options.services.dynamic.timeout.tcp_port_80: 0
358  options.services.dynamic.timeout.udp: 10
359  options.services.log_nonsyn_tcp: no
360  #
361  options.services.reject_denied: yes
362  options.simple_nat.enabled: 1
363  options.simple_nat.list: trusted-external
364  #
365  ########## Various options
366  #
367  options.spoofing.block: no
368  options.spoofing.command:
369  options.spoofing.count: 10
370  options.spoofing.interval: 15
```

TABLE 1-continued

```
371  options.spoofing.log_level: debug
372  options.spoofing.notification: no
373
374  #
375  ########## Receive filter scripts
376  #
377
378  scripts.receive.10 here0
379  # Copyright (C) 1995–2000 WatchGuard Technologies, Inc.
380  # All Rights Reserved
381
382  if (isoob(interface)) {
383      if (ismyipaddr(dest)) allow
384      deny
385  }
386  here0
387  scripts.receive.20 here0
388  # Copyright (C) 1995–2000 WatchGuard Technologies, Inc.
389  # All Rights Reserved
390
391  builtin_options
392  builtin_spoof
393
394  if (isoutside(interface)) {
395      builtin_hostile_sites
396  }
397
398  # Check against known IP exploits
399  if (protocol == tcp && !ack && !syn && !rst) {
400      log(error)
401      deny
402  }
403
404  # Deny certain fragments
405  if (frag & 0x1fff) {
406      if (protocol == tcp && ((frag & 0x1fff) == 1)) {
407          log(error)
408          deny
409      }
410  }
411  here0
412  scripts.receive.80 here0
413  # Copyright (C) 1995–2000 WatchGuard Technologies, Inc.
414  # All Rights Reserved
415
416  builtin_in_dynamic
417  builtin_in_any
418
419  switch (protocol) {
420  case tcp:
421      if (length >= ihl + 14) {
422
423          if (isoutside(interface)) builtin_hostile_dports
424
425          builtin_in_tcp
426
427          # add any other tcp filter rules here
428
429      }
430      break
431
432  case udp:
433      if (length >= ihl + 4) {
434
435              if (isoutside(interface)) builtin_hostile_dports
436
437                  builtin_in_udp
438
439          # add any other udp filter rules here
440
441      }
442      break
443
444  case icmp:
445      if (length >= ihl + 2) {
446      builtin_in_icmp
447
448          if (icmp_type == dest_unreachable ||
449              icmp_type == source_quench ||
```

TABLE 1-continued

```
450              icmp_type == time_exceeded ||
451              icmp_type == parameter_problem ||
452              icmp_type == info_reply ||
453              icmp_type == address_reply ||
454              icmp_type == timestamp_reply) {
455          allow
456        }
457      }
458      break
459
460  default:
461                              builtin_in_ip
462  }
463  here0
464  scripts.receive.99 here0
465  # Copyright (C) 1995–2000 WatchGuard Technologies, Inc.
466  # All Rights Reserved
467  builtin_default
468  here0
469
470  #
471  ########### Startup script. Used to splice commands
472  #
473
474  scripts.startup.00 here0
475  # Copyright (C) 1995–2000 WatchGuard Technologies, Inc.
476  # All Rights Reserved
477  here0
478
479  #
480  ########### Transmit filter scripts
481  #
482
483  scripts.transmit.00: allow
484  services.WatchGuard.comment: Service added on Feb. 10, 2001
485  services.WatchGuard.icon_name: watchguard
486  services.WatchGuard.incoming.allowed.command:
487  services.WatchGuard.incoming.allowed.count: 10
488  services.WatchGuard.incoming.allowed.interval: 15
489  services.WatchGuard.incoming.allowed.log_level: none
490  services.WatchGuard.incoming.allowed.notification: no
491  services.WatchGuard.incoming.denied.command:
492  services.WatchGuard.incoming.denied.count: 10
493  services.WatchGuard.incoming.denied.hostile: no
494  services.WatchGuard.incoming.denied.interval: 15
495  services.WatchGuard.incoming.denied.log_level: debug
496  services.WatchGuard.incoming.denied.notification: no
497  services.WatchGuard.incoming.filter: allow
498  services WatchGuard.incoming.hosts.external: Any
499  services WatchGuard.incoming.hosts.internal: firebox
500  services.WatchGuard.incoming.nat:
501  services.WatchGuard.list: old new
502  services.WatchGuard.new.client_ports: client
503  services.WatchGuard.new.port_number: 4105
504  services.WatchGuard.new.protocol: tcp
505  services.WatchGuard.old.client_ports: client
506  services.WatchGuard.old.port_number: 4103
507  services.WatchGuard.old.protocol: tcp
508  services.WatchGuard.outgoing.allowed.command:
509  services.WatchGuard.outgoing.allowed.count: 10
510  services.WatchGuard.outgoing.allowed.interval: 15
511  services.WatchGuard.outgoing.allowed.log_level: none
512  services.WatchGuard.outgoing.allowed.notification: no
513  services.WatchGuard.outgoing.denied.command:
514  services.WatchGuard.outgoing.denied.count: 10
515  services.WatchGuard.outgoing.denied.interval: 15
516  services.WatchGuard.outgoing.denied.log_level: debug
517  services.WatchGuard.outgoing.denied.notification: no
518  services.WatchGuard.outgoing.filter: allow
519  services.WatchGuard.outgoing.hosts.external: Any
520  services.WatchGuard.outgoing.hosts.internal: Any
521  services.WatchGuard.protocol: multi
522
523  #
524  ########### Client programs need to set the following, at a minimum:
525  ###########
526  ########### networking.ethernet.dd: for each network interface
527  ########### networking.routes.dd: for each gateway (except the default)
528  ########### networking.bridge.optional: for bridged hosts on the opt net
```

TABLE 1-continued

```
529  ########## networking.bridge.external: for bridged hosts on the ext net
530  ########## options.aliases.* for host aliases
531  ########## services. * for services
532  #
```

When the property server determines that the configuration shown in Table 1 has a date earlier than the most recent modification to managed properties, the server instructs the client to send the initial configuration to the server. At the server, the facility deletes any managed properties in the initial configuration (here there are none), then merges in the current managed properties maintained on the server. The resulting merged configuration is shown immediately below Table 2.

TABLE 2

```
 1  config.version: 0.1
 2  config.watchguard.dvcp.default_lease_interval: 30
 3  config.watchguard.dvcp.enable: 1
 4  config.watchguard.dvcp.server.00.ip: 192.168.49.94
 5  config.watchguard.dvcp.server.00.secret: Ce&#y3n~%oJoF.Z7kRSHVuG19u=3i$
 6  config.watchguard.id: 192.168.49.91
 7  #
 8  ########## wg.cfg for Release 4.1
 9  ########## (C) 1996–2000 WatchGuard Technologies, Inc.
10  ########## All Rights Reserved
11  #
12
13  config.watchguard.release: shoreline
14  #
15  default.antispam.domain here0
16  rbl.maps.vix.com
17     dul.maps.vix.com
18     rss.maps.vix.com
19     relays.orbs.org
20  here0
21  default.proxies.ftp.incoming.log.accounting: 0
22  default.proxies.ftp.outgoing.log.accounting: 0
23  default.proxies.ftp.outgoing.readonly: 0
24  default.proxies.ftp.readonly: 1
25  #
26  default.proxies.ftp.sessions: 60
27  default.proxies.ftp.site: 0
28  default.proxies.ftp.timeout: 1800
29  default.proxies.http.anonymize: 1
30  default.proxies.http.known_headers here0
31  Accept
32     Accept-Charset
33     Accept-Encoding
34     Accept-Language
35     Accept-Ranges
36     Age
37     Allow           # additional
38     Alternates      # additional
39     Authorization
40     Cache-Control
41     Connection
42     Content-Base
43     Content-Encoding
44     Content-Language
45     Content-Length
46     Content-Location
47     Content-MD5
48     Content-Range
49     Content-Type
50     Content-Version # additional
51     Cookie          # netscapism
52     Date
53     Derived-From    # additional
54     ETag
55     Expires
56     From
```

TABLE 2-continued

```
 57     Host
 58     If-Modified-Since
 59     If-Match
 60     If-None-Match
 61     If-Range
 62     If-Unmodified-Since
 63     Keep-Alive            # v1.0
 64     Last-Modified
 65     Link                  # additional
 66     Location
 67     Max-Forwards
 68     MIME-Version
 69     Pragma
 70     Proxy-Authenticate
 71     Proxy-Authorization
 72     Proxy-Connection
 73     Public
 74     Range
 75     Referer
 76     Retry-After
 77     Set-Cookie            # netscapism
 78     Server
 79     Transfer-Encoding
 80     UA-pixels             # explorerism
 81     UA-color              # explorerism
 82     UA-OS                 # explorerism
 83     UA-CPU                # explorerism
 84     Upgrade
 85     User-Agent
 86     URI                   # v1.0 (deprecated)
 87     Vary
 88     Via
 89     Warning
 90     WWW-Authenticate
 91  here0
 92  default.proxies.http.log_access: 1
 93  default.proxies.http.no_cookies: 0
 94  default.proxies.http.no_submissions: 0
 95  default.proxies.http.remove_unknown: 1
 96  default.proxies.http.safe_content: 1
 97  default.proxies.http.safe_content_types here0
 98  text/*
 99     image/*
100     audio/*
101     video/*
102   application/x-wls
103  here0
104  default.proxies.http.sigs.applets.cab.deny: yes
105  default.proxies.http.sigs.applets.cab.sig: @MSCF%00%00%00%00
106  default.proxies.http.sigs.applets.java.deny: yes
107  default.proxies.http.sigs.applets.java.sig: @%ca%fe%ba%be
108  default.proxies.http.sigs.applets.ocx.deny: yes
109  default.proxies.http.sigs.applets.ocx.sig:
110  @%5a%4d%00%90%00%03%00%00%00%04%00%00%ff%ff%00%00
111  default.proxies.http.sigs.http_reqs here0
112  @GET%20
113     @HEAD%20
114     @POST%20
115     @PUT%20
116     @CHECKIN%20
117     @CHECKOUT%20
118     @DELETE%20
119     @LINK%20
120     @UNLINK%20
121     @OPTIONS%20
122     @PATCH%20
123     @TRACE%20
124  here0
125  default.proxies.http.sigs.http_resps: @HTTP/
126  default.proxies.http.timeout: 600
127  default.proxies.realaudio.incoming.log.accounting: 0
128  default.proxies.realaudio.outgoing.log.accounting: 0
129  default.proxies.smtp.incoming.allowed.addrs.8bit: yes
130  default.proxies.smtp.incoming.allowed.addrs.chars: _-.+=%*/~!^&?
131  default.proxies.smtp.incoming.allowed.addrs.routes: no
132  default.proxies.smtp.incoming.allowed.esmtp.etrn: no
133  default.proxies.smtp.incoming.allowed.from: *
134  default.proxies.smtp.incoming.allowed.headers here0
135  X-*
```

TABLE 2-continued

```
136  Received
137  From
138  To
139  cc
140  bcc
141  Resent-To
142  Resent-cc
143  Resent-bcc
144  Resent-Message-ID
145  Resent-Reply-To
146  Resent-From
147  Resent-Date
148  Resent-Sender
149  Message-ID
150  In-Reply-To
151  References
152  Keywords
153  Subject
154  Comments
155  Encrypted
156  Date
157  Reply-To
158  Return-path
159  Sender
160  MIME-Version
161  Content-Type
162  Content-Language
163  Content-Length
164  Content-Disposition
165  Content-Transfer-Encoding
166  Content-ID
167  Content-Description
168  Content-MD5
169  Encoding
170  Precedence
171  Approved-By
172  Status
173  here0
174  default.proxies.smtp.incoming.allowed.safe_content: yes
175  default.proxies.smtp.incoming.allowed.safe_content.deny_msg: [Attachment denied
176  by WatchGuard SMTP proxy (type "%t", filename "%f")]
177  default.proxies.smtp.incoming.allowed.safe_content.types here0
178  text/*
179  image/*
180  audio/*
181  video/*
182  multipart/*
183  message/*
184  application/x-wls
185  here0
186  default.proxies.smtp.incoming.allowed.to: *
187  default.proxies.smtp.incoming.denied.file_patterns: *.bat *.exe *.hta *.js *.vb?
188  *.wsf *.wsh *.shs
189  default.proxies.smtp.incoming.denied.from:
190  default.proxies.smtp.incoming.denied.to:
191  default.proxies.smtp.incoming.log.accounting: 0
192  default.proxies.smtp.incoming.timeout: 600
193  default.proxies.smtp.max.size: 3000
194  default.proxies.smtp.max.to: 99
195  default.proxies.smtp.outgoing.allowed.headers here0
196  From
197  To
198  cc
199  bcc
200  Resent-To
201  Resent-cc
202  Resent-bcc
203  Resent-Message-ID
204  Resent-Reply-To
205  Resent-From
206  Resent-Date
207  Message-ID
208  In-Reply-To
209  References
210  Keywords
211  Subject
212  Comments
213  Encrypted
214  Date
```

TABLE 2-continued

```
215  Reply-To
216  MIME-Version
217  Content-Type
218  Content-Language
219  Content-Length
220  Content-Disposition
221  Content-Transfer-Encoding
222  Content-ID
223  Content-Description
224  Content-MD5
225  Encoding
226  Precedence
227  Approved-By
228  Status
229  here0
230  default.proxies.smtp.outgoing.domain:
231  default.proxies.smtp.outgoing.log.accounting: 0
232  default.proxies.smtp.outgoing.masquerade.from:
233  default.proxies.smtp.outgoing.masquerade.from.except:
234  default.proxies.smtp.outgoing.masquerade.mime: no
235  default.proxies.smtp.outgoing.masquerade.msgid: no
236  default.proxies.smtp.outgoing.timeout: 600
237  dvcp.options.aliases.dvcp__local__nets: 10.32.91.0/24
238  dvcp.options.aliases.dvcp__nets: 10.32.94.0/24
239
240  #
241  ########## handsfree installer
242  #
243  installer.enable: no
244  installer.force.trusted.optional.loopback: no
245  installer.frontpanel.enable: no
246  installer.loopback.detect: no
247  networking.bastion: eth2
248  networking.bridge.external: 192.168.49.254
249  networking.bridge.optional:
250  networking.dhcpd.default.default__lease__time: 21600
251  networking.dhcpd.default.max__lease__time: 43200
252  networking.dhcpd.default.router: auto
253  networking.dhcpd.default.serverid: auto
254  networking.dhcpd.default.subnet: auto
255  networking.dhcpd.devices: trusted optional
256  #
257  ########## DHCP server
258  #
259  networking.dhcpd.enable: no
260  networking.domain__suffix:
261  networking.ethernet.00: eth0 192.168.49.91 192.168.49.0 255.255.255.0
262  192.168.49.254
263  networking.ethernet.01: eth1 10.32.91.91 10.32.91.0 255.255.255.0 none
264  networking.ethernet.02:
265
266  #
267  ########## Some global networking options
268  ########## These shouldn't need to change
269  #
270
271  networking.external: eth0
272  networking.hostname: watchguard
273  networking.ipsec.policy.inbound.000.disposition: secure
274  networking.ipsec.policy.inbound.000.dst__ip: 10.32.91.0/24
275  networking.ipsec.policy.inbound.000.dvcp: true
276  networking.ipsec.policy.inbound.000.src__ip: 10.32.94.0/24
277  networking.ipsec.policy.inbound.000.tunnelname: barf91–barf94
278  networking.ipsec.policy.outbound.000.disposition: secure
279  networking.ipsec.policy.outbound.000.dst__ip: 10.32.94.0/24
280  networking.ipsec.policy.outbound.000.dvcp: true
281  networking.ipsec.policy.outbound.000.src__ip: 10.32.91.0/24
282  networking.ipsec.policy.outbound.000.tunnelname: barf91–barf94
283  networking.ipsec.remote__gw.barf94.dvcp: true
284  networking.ipsec.remote__gw.barf94.id: 192.168.49.94
285  networking.ipsec.remote__gw.barf94.id__type: ID__USER__FQDN
286  networking.ipsec.remote__gw.barf94.ike__prefs: agg
287  networking.ipsec.remote__gw.barf94.ip: 192.168.49.94
288  networking.ipsec.remote__gw.barf94.myid__type: ID__USER__FQDN
289  networking.ipsec.remote__gw.barf94.sharedkey: p@x2)KOp)KpX)g*}]m__%TMjdch-
290  networkrng.ipsec.remote__gw.barf94.type: isakmp
291  networking.ipsec.tunnel.barf91-barf94.dvcp: true
292  networking.ipsec.tunnel.barf91-barf94.remote__gw: barf94
293  networkmg.ipsec.tunnel.barf91-barf94.sap.00.esp.alg: 2
```

TABLE 2-continued

```
294  networkmg.ipsec.tunnel.barf91-barf94.sap.00.esp.authalg: 2
295  networking.ipsec.tunnel.barf91-barf94.sap.00.life.kbytes: 8192
296  networking.ipsec.tunnel.barf91-barf94.sap.00.life.seconds: 86400
297  networking.ipsec.tunnel.barf91-barf94.sap.00.type: ESP
298  networking.nameservice.remote.dns.0:
299  networking.nameservice.remote.dns.1:
300  networking.nameservice.remote.wins.0:
301  networking.nameservice.remote.wins.1:
302  networking.oob.chat.ttyS0: "" +\p+\p+\d\r\pATH "" \dAT&F OK ATE0 OK ATS0=1 OK
303  networking.oob.chat.ttyS2: "" +\p+\p+\d\r\pATH "" \dAT&F OK ATE0 OK ATS0=1 OK
304
305  #
306  ########## out-of-band
307  #
308  networking.oob.debug: no
309  networking.oob.ppp.ttyS0: 38400 crtscts silent 192.168.254.1:192.168.254.2
310  networking.oob.ppp.ttyS2: 38400 crtscts silent 192.168.254.1:192.168.254.2
311  options.aliases.dvcp__local__nets: 10.32.91.0/24
312  options.aliases.dvcp__nets: 10.32.94.0/24
313  options.controld.control__tty: /dev/ttyS0
314  #
315  options.controld.log__host: 192.168.50.21=020d0d4929587f6b162f0473457a6861
316  options.controld.logdb__entries: 100000
317  options.controld.notify__host:
318  options.controld.serial__config: 1
319  options.controld.tcp__config: write
320  options.default.incoming.command:
321  options.default.incoming.count: 10
322  #
323  options.default.incoming.hostile: no
324  options.default.incoming.interval: 15
325  options.default.incoming.log__broadcasts: no
326  options.default.incoming.log__level: warning
327  options.default.incoming.notification: no
328  options.default.outgoing.command:
329  options.default.outgoing.count: 10
330  options.default.outgoing.interval: 15
331  options.default.outgoing.log__broadcasts: no
332  options.default.outgoing.log__level: debug
333  options.default.outgoing.notification: no
334  #
335  options.fail-over.bcast__cookie: true
336  options.fail-over.hb__delay: 5
337  options.fail-over.state: 5
338  options.filter.vpn__bypass: no
339  options.hostile__port.command:
340  options.hostile__port.count:
341  options.hostile__port.hostile: no
342  options.hostile__port.interval:
343  #
344  options.hostile__port.list:
345  options.hostile__port.log__level: warning
346  options.hostile__port.notification: no
347  options.hostile__site.command:
348  options.hostile__site.count:
349  options.hostile__site.duration: 20
350  options.hostile__site.exceptions:
351  options.hostile__site.interval:
352  #
353  options.hostile__site.list:
354  options.hostile__site.log__level: info
355  options.hostile__site.notification: no
356  options.ipoptions.block: no
357  options.ipoptions.command:
358  options.ipoptions.count: 0
359  options.ipoptions.interval: 0
360  options.ipoptions.log__level: warning
361  options.ipoptions.notification: no
362  options.masquerade.tcp.fin.timeout: 15
363  options.masquerade.tcp.timeout: 43205
364  options.masquerade.udp.timeout: 15
365  options.notification.interval: 60
366  #
367  options.notification.mail__address: nobody
368  options.notification.pager__code:
369  options.notification.pager__num:
370  #
371  options.probe.address: no
372  options.probe.address.command:
```

TABLE 2-continued

```
373  options.probe.address.count: 10
374  options.probe.address.hostile: 1
375  options.probe.address.interval: 15
376  options.probe.address.log_level: info
377  options.probe.address.notification: no
378  options.probe.port: no
379  options.probe.port.command:
380  options.probe.port.count: 10
381  options.probe.port.hostile: 1
382  options.probe.port.interval: 15
383  options.probe.port.log_level: warning
384  options.probe.port.notification: no
385  #
386  options.proxies.http.webblocker.denymsg: Request blocked by WebBlocker
387  options.services.block_nonestablished_tcp: yes
388  options.services.dynamic.timeout.tcp: 43200
389  options.services.dynamic.timeout.tcp.fin: 10
390  options.services.dynamic.timeout.tcp.linger 10
391  options.services.dynamic.timeout.tcp_port_80: 0
392  options.services.dynamic.timeout.udp: 10
393  options.services.log_nonsyn_tcp: no
394  #
395  options.services.reject_denied: yes
396  options.simple_nat.enabled: 1
397  options.simple_nat.list: trusted-external
398  #
399  ########### Various options
400  #
401  options.spoofing.block: no
402  options.spoofing.command:
403  options.spoofing.count: 10
404  options.spoofing.interval: 15
405  options.spoofing.log_level: debug
406  options.spoofing.notification: no
407
408  #
409  ########### Receive filter scripts
410  #
411
412  scripts.receive.10 here0
413  # Copyright (C) 1995–2000 WatchGuard Technologies, Inc.
414  # All Rights Reserved
415
416  if (isoob(interface)) {
417     if (ismyipaddr(dest)) allow
418     deny
419  }
420  here0
421  scripts.receive.20 here0
422  # Copyright (C) 1995–2000 WatchGuard Technologies, Inc.
423  # All Rights Reserved
424
425  builtin_options
426  builtin_spoof
427
428  if (isoutside(interface)) {
429     builtin_hostile_sites
430  }
431
432  # Check against known IP exploits
433  if (protocol == tcp && !ack && !syn && !rst) {
434     log(error)
435     deny
436  }
437
438  # Deny certain fragments
439  if (frag & 0x1fff) {
440     if (protocol == tcp && ((flag & 0x1fff) == 1)) {
441                              log(error)
442        deny
443     }
444  }
445  here0
446  scripts.receive.80 here0
447  # Copyright (C) 1995–2000 WatchGuard Technologies, Inc.
448  # All Rights Reserved
449
450  builtin_in_dynamic
451  builtin_in_any
```

TABLE 2-continued

```
452
453  switch (protocol) {
454  case tcp:
455      if (length >= ihl + 14) {
456
457          if (isoutside(interface)) builtin_hostile_dports
458
459          builtin_in_tcp
460
461          # add any other tcp filter rules here
462
463      }
464      break
465
466  case udp:
467      if (length >= ihl + 4) {
468
469          if (isoutside(interface)) builtin_hostile_dports
470
471          builtin_in_udp
472
473          # add any other udp filter rules here
474
475      }
476      break
477
478  case icmp:
479      if (length >= ihl + 2) {
480          builtin_in_icmp
481
482          if (icmp_type == dest_unreachable ||
483             icmp_type == source_quench ||
484             icmp_type == time_exceeded ||
485             icmp_type == parameter_problem ||
486             icmp_type == info_reply ||
487             icmp_type == address_reply ||
488             icmp_type == timestamp_reply) {
489          allow
490         }
491      }
492      break
493
494  default:
495     builtin_in_ip
496  }
497  here0
498  scripts.receive.99 here0
499  # Copyright (C) 1995-2000 WatchGuard Technologies, Inc.
500  # All Rights Reserved
501  builtin_default
502  here0
503
504  #
505  ########## Startup script. Used to splice commands
506  #
507
508  scripts.startup.00 here0
509  # Copyright (C) 1995-2000 WatchGuard Technologies, Inc.
510  # All Rights Reserved
511  here0
512
513  #
514  ########## Transmit filter scripts
515  #
516
517  scripts.transmit.00: allow
518  services.Any.client_ports:
519  services.Any.comment:
520  services.Any.dvcp: true
521  services.Any.icon_name: any
522  services.Any.incoming.allowed.command:
523  services.Any.incoming.allowed.count: 10
524  services.Any.incoming.allowed.interval: 15
525  services.Any.incoming.allowed.log_level: none
526  services.Any.incoming.allowed.notification: no
527  services.Any.incoming.denied.command:
528  services.Any.incoming.denied.count: 10
529  services.Any.incoming.denied.hostile: no
530  services.Any.incoming.denied.interval: 15
```

TABLE 2-continued

```
531  services.Any.incoming.denied.log_level: debug
532  services.Any.incoming.denied.notification: no
533  services.Any.incoming.filter: allow
534  services.Any.incoming.hosts.external: dvcp_nets
535  services.Any.incoming.hosts.internal: dvcp_local_nets
536  services.Any.incoming.nat:
537  services.Any.outgoing.allowed.command:
538  services.Any.outgoing.allowed.count: 10
539  services.Any.outgoing.allowed.interval: 15
540  services.Any.outgoing.allowed.log_level: none
541  services.Any.outgoing.allowed.notification: no
542  services.Any.outgoing.denied.command:
543  services.Any.outgoing.denied.count: 10
544  services.Any.outgoing.denied.interval: 15
545  services.Any.outgoing.denied.log_level: debug
546  services.Any.outgoing.denied.notification: no
547  services.Any.outgoing.filter: allow
548  services.Any.outgoing.hosts.external: dvcp_nets
549  services.Any.outgoing.hosts.internal: dvcp_local_nets
550  services.Any.port_number:
551  services.Any.protocol: Any
552  services.WatchGuard.comment: Service added on Feb. 10, 2001
553  services.WatchGuard.icon_name: watchguard
554  services.WatchGuard.incoming.allowed.command:
555  services.WatchGuard.incoming.allowed.count: 10
556  services.WatchGuard.incoming.allowed.interval: 15
557  services.WatchGuard.incoming.allowed.log_level: none
558  services.WatchGuard.incoming.allowed.notification: no
559  services.WatchGuard.incoming.denied.command:
560  services.WatchGuard.incoming.denied.count: 10
561  services.WatchGuard.incoming.denied.hostile: no
562  services.WatchGuard.incoming.denied.interval: 15
563  services.WatchGuard.incoming.denied.log_level: debug
564  services.WatchGuard.incoming.denied.notification: no
565  services.WatchGuard.incoming.filter: allow
566  services.WatchGuard.incoming.hosts.external: Any
567  services.WatchGuard.incoming.hosts.internal: firebox
568  services.WatchGuard.incoming.nat:
569  services.WatchGuard.list: old new
570  services.WatchGuard.new.client_ports: client
571  services.WatchGuard.new.port_number: 4105
572  services.WatchGuard.new.protocol: tcp
573  services.WatchGuard.old.client_ports: client
574  services.WatchGuard.old.port_number: 4103
575  services.WatchGuard.old.protocol: tcp
576  services.WatchGuard.outgoing.allowed.command:
577  services.WatchGuard.outgoing.allowed.count: 10
578  services.WatchGuard.outgoing.allowed.interval: 15
579  services.WatchGuard.outgoing.allowed.log_level: none
580  services.WatchGuard.outgoing.allowed.notification: no
581  services.WatchGuard.outgoing.denied.command:
582  services.WatchGuard.outgoing.denied.count: 10
583  services.WatchGuard.outgoing.denied.interval: 15
584  services.WatchGuard.outgoing.denied.log_level: debug
585  services.WatchGuard.outgoing.denied.notification: no
586  services.WatchGuard.outgoing.filter: allow
587  services.WatchGuard.outgoing.hosts.external: Any
588  services.WatchGuard.outgoing.hosts.internal: Any
589  services.WatchGuard.protocol: multi
590
591  #
592  ########## Client programs need to set the following, at a minimum:
593  ##########
594  ########## networking.ethernet.dd: for each network interface
595  ########## networking.routes.dd: for each gateway (except the default)
596  ########## networking.bridge.optional: for bridged hosts on the opt net
597  ########## networking.bridge.external: for bridged hosts on the ext net
598  ########## options.aliases. * for host aliases
599  ########## services. * for services
600  #
```

By comparing the initial configuration shown in Table 1 to the merged configuration shown in Table 2, the facility determines that they are different. As a first matter, the MD5 digests of these two configurations are different. The digest for the initial configuration is 365c991bf1addd2bbe5a76be45e7773f, while the digest for the merged configuration is 07b3fa64aec28be15b9b350f2e374c7a.

As a second matter, it can be seen that the following lines in the merged configuration have been added to the initial configuration: 2–6, 237–238, 273–297, 311–312, and 518–551.

Lines 2–6 contain properties used by the client to communicate with the property server. Lines 237–238 contain administrative properties identifying substantive properties added to the configuration to support the new VPN. These administrative properties can be used by the server to later delete these managed properties.

Lines 273–282 contain properties identifying the protected resources at this client's end of the new VPN (10.32.91.0/24), as well as those at the other end (10.32.94.0/24). Additional protected resources may be listed at each end, which has the effect in some embodiments of establishing a separate VPN between each protected resource at a first end and each protected resource at the other end. This section of the configuration may also contain exceptions within the protected IP address ranges that are not protected. For instance, such an exclusion could omit the IP address 10.32.91.1 from the list of resources protected at this client's end of the new VPN.

Lines 283–290 contain properties identifying the security device at the other end of the VPN, for use in communicating with the other security device to exchange VPN data.

Lines 291–297 contain security properties for the VPN, such as algorithms to be used for tunnel encryption and authentication, as well as how long each dynamically generated session key will be used. These properties are typically specified by a user by selecting one of a number of security templates, each representing a different level of security.

Lines 311 and 312 contain additional administrative properties.

Lines 518–551 contain service properties for the new VPN. These service properties determine which network protocols can be carried by the VPN; that is, which networking applications may use the VPN to exchange data. These service properties are preferably specified by a user by selecting protocols to include or exclude in a services template.

Because this merged configuration differs from the client's existing configuration, the server sends it to the client for adoption by the client. Once this configuration has been adopted by this client, and the corresponding updated configuration has been adopted by the security device at the other end of the VPN, the new VPN will be operative.

Table 3 immediately below shows an example of a template, called a "tunnel template," typically used to specify properties for a VPN.

TABLE 3

1  config.version: 0.1
2  dvcp.devices.00000.contact_index:
3  dvcp.devices.00000.cookie: 0
4  dvcp.devices.00000.dns.0:
5  dvcp.devices.00000.dns.1:
6  dvcp.devices.00000.domain_suffix:

TABLE 3-continued 7  dvcp.devices.00000.enclevel:
8  dvcp.devices.00000.id: 192.168.49.94
9  dvcp.devices.00000.lease.time: 3600
10 dvcp.devices.00000.name: barf94
11 dvcp.devices.00000.props: 00000
12 dvcp.devices.00000.ro: ro
13 dvcp.devices.00000.rw: rw
14 dvcp.devices.00000.secret: pYHouw}M'QC7)'#z%kVwle{dKw6~s6
15 dvcp.devices.00000.type: fbii
16 dvcp.devices.00000.wins.0:
17 dvcp.devices.00000.wins.1:
18 dvcp.devices.00001.contact_index:
19 dvcp.devices.00001.cookie: 0
20 dvcp.devices.00001.dns.0:
21 dvcp.devices.00001.dns.1:
22 dvcp.devices.00001.domain_suffix:
23 dvcp.devices.00001.enclevel:
24 dvcp.devices.00001.id: 192.168.49.91
25 dvcp.devices.00001.lease.time: 3600
26 dvcp.devices.00001.name: barf91
27 dvcp.devices.00001.props: 00000
28 dvcp.devices.00001.ro: ro
29 dvcp.devices.00001.rw: rw
30 dvcp.devices.00001.secret: Ce&#y3n~%oJoF.Z7kRSHVuG19u=3i$
31 dvcp.devices.00001.type: fbii
32 dvcp.devices.00001.wins.0:
33 dvcp.devices.00001.wins.1:
34 dvcp.license.00: VPNMGR-100-000000-01F785CA
35 dvcp.policies.00000.cookie: 0
36 dvcp.policies.00000.device: 00000
37 dvcp.policies.00000.disposition: secure
38 dvcp.policies.00000.name: Trusted Network
39 dvcp.policies.00000.resource: 10.32.94.0/24
40 dvcp.policies.00001.cookie: 0
41 dvcp.policies.00001.device: 00001
42 dvcp.policies.00001.disposition: secure
43 dvcp.policies.00001.name: Trusted Network
44 dvcp.policies.00001.resource: 10.32.91.0/24
45 dvcp.props.00000.cookie: 0
46 dvcp.props.00000.name: DVCP_Any
47 #dvcp.props.00000.precedence: dvcp
48 dvcp.props.00000.prefix: services.Any
49 dvcp.props.00000.services.Any.client_ports:
50 dvcp.props.00000.services.Any.comment:
51 dvcp.props.00000.services.Any.dvcp: true
52 dvcp.props.00000.services.Any.icon_name: any
53 dvcp.props.00000.services.Any.incoming.allowed.command:
54 dvcp.props.00000.services.Any.incoming.allowed.count: 10
55 dvcp.props.00000.services.Any.incoming.allowed.interval: 15
56 dvcp.props.00000.services.Any.incoming.allowed.log_level: none
57 dvcp.props.00000.services.Any.incoming.allowed.notification: no
58 dvcp.props.00000.services.Any.incoming.denied.command:
59 dvcp.props.00000.services.Any.incoming.denied.count: 10
60 dvcp.props.00000.services.Any.incoming.denied.hostile: no
61 dvcp.props.00000.services.Any.incoming.denied.interval: 15
62 dvcp.props.00000.services.Any.incoming.denied.log_level: debug
63 dvcp.props.00000.services.Any.incoming.denied.notification: no
64 dvcp.props.00000.services.Any.incoming.filter: allow
65 dvcp.props.00000.services.Any.incoming.hosts.external: dvcp_nets
66 dvcp.props.00000.services.Any.incoming.hosts.internal: dvcp_local_nets
67 dvcp.props.00000.services.Any.incoming.nat:
68 dvcp.props.00000.services.Any.outgoing.allowed.command:
69 dvcp.props.00000.services.Any.outgoing.allowed.count: 10
70 dvcp.props.00000.services.Any.outgoing.allowed.interval: 15
71 dvcp.props.00000.services.Any.outgoing.allowed.log_level: none
72 dvcp.props.00000.services.Any.outgoing.allowed.notification: no
73 dvcp.props.00000.services.Any.outgoing.denied.command:
74 dvcp.props.00000.services.Any.outgoing.denied.count: 10
75 dvcp.props.00000.services.Any.outgoing.denied.interval: 15
76 dvcp.props.00000.services.Any.outgoing.denied.log_level: debug TABLE 3-continued

```
 77  dvcp.props.00000.services.Any.outgoing.denied.notification: no
 78  dvcp.props.00000.services.Any.outgoing.filter: allow
 79  dvcp.props.00000.services.Any.outgoing.hosts.external:
     dvcp_nets
 80  dvcp.props.00000.services.Any.outgoing.hosts.internal:
     dvcp_local_nets
 81  dvcp.props.00000.services.Any.port_number:
 82  dvcp.props.00000.services.Any.protocol: Any
 83  dvcp.security.00000.cookie: 0
 84  dvcp.security.00000.esp.alg: 2
 85  dvcp.security.00000.esp.authalg: 2
 86  dvcp.security.00000.life.kbytes: 8192
 87  dvcp.security.00000.life.seconds: 86400
 88  dvcp.security.00000.name: Strong with Authentication
 89  dvcp.security.00000.type: ESP
 90  dvcp.security.00001.cookie: 0
 91  dvcp.security.00001.esp.alg: 1
 92  dvcp.security.00001.esp.authalg: 1
 93  dvcp.security.00001.life.kbytes: 8192
 94  dvcp.security.00001.life.seconds: 86400
 95  dvcp.security.00001.name: Medium with Authentication
 96  dvcp.security.00001.type: ESP
 97  dvcp.security.00002.cookie 0
 98  dvcp.security.00002.esp.alg: 1
 99  dvcp.security.00002.esp.authalg: 0
100  dvcp.security.00002.life.kbytes: 8192
101  dvcp.security.00002.life.seconds: 86400
102  dvcp.security.00002.name: Medium
103  dvcp.security.00002.type: ESP
104  dvcp.tunnels.00001.cookie: 7537608
105  dvcp.tunnels.00001.name: barf91-barf94
106  dvcp.tunnels.00001.nameservice:
107  dvcp.tunnels.00001.policies.000: 00001
108  dvcp.tunnels.00001.policies.001: 00000
109  dvcp.tunnels.00001.security: 00000
```

Lines 1–17 contain information about a security device at a first end of the new VPN. Lines 18–33 similarly contain details about the security device at the second end of the new VPN. Lines 35–39 contain information about the first end's participation in the VPN, while lines 40–44 contain information about the second end's participation in the VPN. In some embodiments, this section of the template may list more than two ends for the VPN. In this embodiment, the equivalent of a VPN cloud is established by the facility: separate VPNs between each pair of ends, all of these VPNs sharing the same characteristics and therefore acting as a single VPN cloud. Lines 45–82 contain service properties merged into the configuration. Lines 83–103 contain security properties merged into the configuration.

It will be understood by those skilled in the art that the above-described facility could be adapted or extended in various ways. For example, the facility may manage properties for establishing VPNs of all different types and may, in fact, manage properties for a variety of other purposes. While the foregoing description makes reference to preferred embodiments, the scope of the invention is defined solely by the claims that follow and the elements recited therein.

The invention claimed is:

1. A method in a computing system for updating properties used by a subject computer system using a helper computer system, comprising:

maintaining a set of current properties on the subject computer system;

in the helper computer system, receiving new properties for the subject computer system;

transmitting the current properties from the subject computer system to the helper computer system;

in the helper computer system, merging the received new properties into a copy of the transmitted current properties;

comparing the received current properties to the copy of the received current properties into which were merged the received new properties;

if the received current properties to the copy of the received current properties differ, transmitting the copy of the current properties into which were merged the received new properties to the subject computer system; and in the subject computer system, adopting the transmitted copy of the current properties into which were merged the received new properties.

2. The method of claim 1 wherein the comparing includes:

generating a digest of each the received current properties to the copy of the received current properties into which were merged the received new properties; and comparing the generated digests.

3. The method of claim 2 wherein the digests are generated using a hashing function.

4. The method of claim 2 wherein the digests are generated using an MD5 hashing function.

5. The method of claim 2 wherein the merging includes:

deleting from the copy of the current properties any properties managed by the helper computer system; and adding properties including the new properties to the copy of the current properties.

6. The method of claim 5 wherein the deleting includes deleting properties in the copy of the current properties identified by administrative properties among the current properties.

7. The method of claim 1 wherein the merging includes adding to the copy of the current properties administrative properties identifying other properties added to the copy of the current properties.

8. A method in a computing system for remotely managing properties for a subject computer system, comprising:

receiving a property update inquiry from the subject computer system, the inquiry indicating a time at which properties in use by the subject computer system were updated;

comparing the indicated time to an update time for managed properties;

if the indicated time is earlier than the update time, retrieving a copy of the existing properties used by the subject computer system;

merging managed properties into the copy of the existing properties; and sending the merged properties to the subject computer system.

9. The method of claim 8 wherein the merged properties sent to the subject computer system include an instruction to adopt the merged properties.

10. The method of claim 8, further comprising comparing the merged properties to the existing properties, and wherein the sending is only performed if the merged properties and the existing properties are not the same.

11. A method in a server computer system for establishing a virtual private network between a first private network having a first security device and a second private network having a second security device, comprising:

generating properties for the first security device to direct the participation of the first security device in the virtual private network;

generating properties for the second security device to direct the participation of the second security device in the virtual private network;

distributing the properties generated for the first security device to the first security device for use by the first security device to participate in the virtual private network; and distributing the properties generated for the second security device to the second security device for use by the second security device to participate in the virtual private network, wherein the distributing includes transmitting the generated properties to the security devices in response to inquiries from the security devices at times subsequent to the generating.

12. The method of claim 11 wherein the properties generated for the first security device are distinct from the properties generated for the second security device.

13. The method of claim 11 wherein the generated properties are adopted by both security devices to establish the virtual private network.

14. The method of claim 11 wherein the distributing includes transmitting the generated properties to the security devices in response to the generation of the properties.

15. The method of claim 11, further comprising receiving a single set of VPN specifications in the server computer system, and wherein the method is performed without regard for any user input received subsequent to receiving the single set of VPN specifications.

16. The method of claim 11 wherein the generation of properties for each security device includes:

selecting a property template; and populating the selected property template with information specific to the first private network and/or information specific to the second private network.

17. The method of claim 11 wherein the generated properties include security properties relating to the protection of data traveling in the virtual private network.

18. The method of claim 17 wherein the security properties specify encryption parameters for data traveling in the virtual private network.

19. The method of claim 11 wherein the generated properties include resource properties relating to sources and destinations in the private networks for data traveling in the virtual private network.

20. The method of claim 19 wherein the resource properties specify addresses of network nodes within the private networks that may send and receive data traveling in the virtual private network.

21. The method of claim 11 wherein the generated properties include service properties relating to classes of data that may travel in the virtual private network.

22. The method of claim 21 wherein the service properties specify network protocols for which data may travel in the virtual private network.

23. The method of claim 11, further comprising performing the generating and distributing for one or more additional security devices in order to establish the virtual private network between more than two private networks.

24. A computer-readable medium whose contents cause a server computer system to establish a virtual private network between a first private network having a first security device and a second private network having a second security device by:

generating properties for the first security device to direct the participation of the first security device in the virtual private network;

generating properties for the second security device to direct the participation of the second security device in the virtual private network;

distributing the properties generated for the first security device to the first security device for use by the first security device to participate in the virtual private network; and distributing the properties generated for the second security device to the second security device for use by the second security device to participate in the virtual private network, wherein the distributing includes transmitting the generated properties to the security devices in response to inquiries from the security devices at times subsequent to the generating.

25. A method in a single manager computing system for managing properties for a plurality of managed computer systems, comprising, reiteratively:

receiving new managed properties for an identified managed computer system;

determining whether the new managed properties received differ from those in use by the identified managed computer system; and delivering the received new managed properties to the identified managed computer system, wherein the new managed properties are delivered only if it is not determined that the new managed properties received differ from those in use by the identified managed computer system.

26. The method of claim 25 wherein at least one of the managed computer systems is a dedicated network security device.

27. The method of claim 25 wherein, for each managed computer system, the managed properties are a proper subset of a set properties used by the managed computer system, and wherein the delivering includes:

receiving the set of properties used by the managed computer system;

substituting for managed properties in the set of properties used by the managed computer system new managed properties received by the manager computer system; and conveying to the managed computer system the set of properties used by the managed computer system in which the new managed properties have been substituted.

28. The method of claim 25, further comprising cacheing the received new managed properties until delivery.

29. A method in a distinguished computing system for managing properties used by the distinguished computer system in its operation, comprising:

maintaining a first set of properties;

receiving from a separate computing system a second set of properties; and using both the first set of properties and the second set of properties in the operation of the distinguished computing system.

30. The method of claim 29, further comprising:

updating one or more properties among the first set of properties at the initiation of the distinguished computing system; and using the updated properties in the operation of the distinguished computing system.

31. The method of claim 29, further comprising:

receiving one or more updated properties from the separate computing system; and using the updated properties in the operation of the distinguished computing system.

32. The method of claim 31 wherein the updated properties specify the establishment of a virtual private network between the distinguished computing system and an additional computing system.

33. The method of claim 29, further comprising:
sending the first and second sets of properties as a configuration to the separate computing system;
receiving from the separate computer system a replacement configuration, in which properties of the second set have been modified; and
using the properties in the replacement configuration in the operation of the distinguished computing system.

34. A method in a manager computing system for participating in the management of properties used by a client computing system, comprising:
determining that properties of the client computing system managed by the manager computing system should be updated; and
instructing the client computing system to use in its operation manager-managed properties updated in accordance with the determination, in conjunction with properties of the client computing system managed by the client computing system.

35. The method of claim 34, further comprising:
receiving from the client computing system a client configuration comprising the manager-managed properties and client-managed properties in use by the client computing system;
incorporating in the received client configuration the manager-managed properties updated in accordance with the determination to produce an updated client configuration; and
returning the updated client configuration to the client computing system with an instruction to use the updated client configuration in the operation of the client computing system.

36. The method of claim 34 wherein the updated properties specify the establishment of a virtual private network between the client computing system and an additional computing system.

37. A system for managing properties for a distinguished computing system, comprising:
the distinguished computing system, which utilizes both locally-managed properties and remotely-managed properties, and which manages the locally-managed properties; and
a manager computing system communicatively connected to the distinguished computing system, which manages the remotely-managed properties.

38. The method of claim 37 wherein the distinguished computing system is a specialized network security device.

* * * * *

UNITED STATES PATENT AND TRADEMARK OFFICE
CERTIFICATE OF CORRECTION

PATENT NO. : 7,237,263 B1
APPLICATION NO. : 09/800754
DATED : June 26, 2007
INVENTOR(S) : Boscolo et al.

It is certified that error appears in the above-identified patent and that said Letters Patent is hereby corrected as shown below:

In column 9, line 50, delete "*.wsf*.wsh*.shs" and insert -- *.wsf *.wsh *.shs --, therefor.

In column 11, line 36, delete "networkmg." and insert -- networking. --, therefor.

In column 13, line 3, after "command" insert -- : --.

In column 13, line 65, after "linger" insert -- : --.

In column 15, line 1, delete "spooting." and insert -- spoofing. --, therefor.

In column 17, line 49, after "services" insert -- . --.

In column 17, line 50, after "services" insert -- . --.

In column 25, line 76, delete "networkrng." and insert -- networking. --, therefor.

In column 25, line 79, delete "networkmg." and insert -- networking. --, therefor.

In column 27, line 1, delete "networkmg." and insert -- networking. --, therefor.

In column 29, line 18, after "linger" insert -- : --.

In column 29, line 68, delete "((flag" and insert -- ((frag --, therefor.

UNITED STATES PATENT AND TRADEMARK OFFICE
CERTIFICATE OF CORRECTION

PATENT NO. : 7,237,263 B1
APPLICATION NO. : 09/800754
DATED : June 26, 2007
INVENTOR(S) : Boscolo et al.

It is certified that error appears in the above-identified patent and that said Letters Patent is hereby corrected as shown below:

In column 37, line 23, after "cookie" insert -- : --.

In column 38, line 15, in Claim 2, after "each" insert -- of --.

Signed and Sealed this

Twenty-fourth Day of June, 2008

JON W. DUDAS
*Director of the United States Patent and Trademark Office*